United States Patent
Armstrong et al.

(10) Patent No.: US 9,141,314 B2
(45) Date of Patent: Sep. 22, 2015

(54) SYSTEMS AND METHODS FOR UPDATING A USER INTERFACE FOR A PRINTING DEVICE

(75) Inventors: Charles Thomas Armstrong, Rancho Santa Margarita, CA (US); Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/344,466

(22) Filed: Jan. 5, 2012

(65) Prior Publication Data

US 2012/0188574 A1    Jul. 26, 2012

Related U.S. Application Data

(63) Continuation-in-part of application No. 13/010,460, filed on Jan. 20, 2011.

(51) Int. Cl.
*G06F 3/12* (2006.01)

(52) U.S. Cl.
CPC ............ *G06F 3/1205* (2013.01); *G06F 3/1232* (2013.01); *G06F 3/1255* (2013.01); *G06F 3/1285* (2013.01); *G06F 3/121* (2013.01)

(58) Field of Classification Search
None
See application file for complete search history.

(56) References Cited

U.S. PATENT DOCUMENTS

| | | | |
|---|---|---|---|
| 6,590,589 B1 | 7/2003 | Sluiman | |
| 6,920,607 B1 | 7/2005 | Ali | |
| 6,941,521 B2 | 9/2005 | Lin | |
| 6,990,654 B2 | 1/2006 | Carroll | |
| 7,386,835 B1 | 6/2008 | Desai | |
| 2005/0204047 A1 | 9/2005 | Mitchell | |
| 2006/0028681 A1* | 2/2006 | Aagesen | ...................... 358/1.15 |
| 2006/0195794 A1 | 8/2006 | Sun | |
| 2006/0221361 A1 | 10/2006 | Takagi | |
| 2007/0115839 A1 | 5/2007 | Yang | |
| 2007/0130205 A1 | 6/2007 | Dengler | |
| 2008/0003036 A1* | 1/2008 | Kato et al. | ...................... 400/62 |

(Continued)

FOREIGN PATENT DOCUMENTS

| | | | |
|---|---|---|---|
| JP | 2008276744 | | 11/2008 |
| JP | 2010072816 | * | 4/2010 |

OTHER PUBLICATIONS

JP2010072816-translation, Hakozaki, Apr. 2, 2010.*

(Continued)

*Primary Examiner* — Fan Zhang
(74) *Attorney, Agent, or Firm* — Canon U.S.A., Inc. IP Division

(57) ABSTRACT

Systems and methods for updating a user interface that indicates printing capabilities for a printing device read one or more first printing capabilities from first printing capabilities data, generate a user interface that includes a plurality of interface elements, read one or more second printing capabilities from second printing capabilities data, the one or more second printing capabilities including at least one printing capability different from the one or more first printing capabilities, generate delta printing capabilities data indicating changed printing capabilities based on the one or more first printing capabilities and the one or more second printing capabilities, wherein the delta printing capabilities data includes the at least one printing capability different from the one or more first printing capabilities, and update one or more interface elements associated with the changed printing capabilities indicated by the delta printing capabilities data.

15 Claims, 12 Drawing Sheets

(56) References Cited

U.S. PATENT DOCUMENTS

| | | |
|---|---|---|
| 2008/0007742 A1 | 1/2008 | Abe |
| 2008/0170254 A1 | 7/2008 | Shah |
| 2009/0063710 A1 | 3/2009 | Sekine |
| 2009/0091781 A1* | 4/2009 | Nishimura ............. 358/1.15 |
| 2009/0157906 A1* | 6/2009 | Yanagi ..................... 710/5 |
| 2010/0149579 A1 | 6/2010 | Shah |
| 2010/0188688 A1* | 7/2010 | Selvaraj et al. ......... 358/1.15 |
| 2010/0281076 A1* | 11/2010 | Pan et al. ................ 707/811 |
| 2011/0026072 A1 | 2/2011 | Xiao |
| 2012/0147414 A1* | 6/2012 | Hutchings et al. ...... 358/1.15 |

OTHER PUBLICATIONS

Microsoft, "PrintTicket and PrintCapabilities Support in Windows Print Drivers", Feb. 2006, pp. 1-23.

Microsoft, "Print Schema Specification," 2007, pp. 1-343.

* cited by examiner

```
<psf:PrintCapabilities

<psf:Feature name="psk:PaperSize">
<psf:Property name="ns0000:SettingChanged"><psf:Value xsi:type="xsd:string">constrained</psf:Value>
</psf:Property>
<psf:Property name="ns0000:DeltaPrintTicketSettingTaken"><psf:Value xsi:type="xsd:string">True</
psf:Value>
</psf:Property>

<psf:Property name="ns0000:OtherBasePrintSettingsChanged"><psf:Value xsi:type="xsd:string">False</
psf:Value>
</psf:Property>

<psf:Option name="psk:NorthAmericaLegal" constrained="psk:PrintSetting">
</psf:Option>

<psf:Option name="psk:ISOA6" constrained="psk:PrintSetting">
</psf:Option>

<psf:Option name="psk:JISB5" constrained="psk:PrintSetting">
</psf:Option>

<psf:Option name="psk:JapanDoubleHagakiPostcard" constrained="psk:PrintSetting">
</psf:Option>

<psf:Option name="psk:JapanChou3Envelope" constrained="psk:PrintSetting">
</psf:Option>

<psf:Option name="psk:JapanChou4Envelope" constrained="psk:PrintSetting">
</psf:Option>

<psf:Option name="psk:JapanYou4Envelope" constrained="psk:PrintSetting">
</psf:Option>

<psf:Option name="psk:JapanYou6Envelope" constrained="psk:PrintSetting">
</psf:Option>

<psf:Option name="ns0000:DiscTrayG_2" constrained="psk:PrintSetting">
</psf:Option>

<psf:Option name="psk:CustomMediaSize" constrained="psk:PrintSetting">
</psf:Option>
</psf:Feature>

</psf:PrintCapabilities>
```

FIG. 9

| Setting | Option | Change |
|---|---|---|
| Paper Size | 11x17in 279.4x431.8mm (Scaled) | On |
| | 17x22in 431.8x558.8mm (Scaled) | On |
| | 8x10in 203.2x254.0mm (Scaled) | On |
| | A2 (Scaled) | On |
| | A3 (Scaled) | On |
| | A3+ 13x19in 329x483mm (Scaled) | On |
| | A4+ (Scaled) | On |
| | B3 (Scaled) | On |
| | B4 (Scaled) | On |
| | Letter+ (Scaled) | On |
| Duplex Printing | Duplex Printing On | On |
| | Duplex Printing Off | On |
| | Automatic On | On |
| | Automatic Off | On |

ΔPC — 1200; 1210 Setting; 1220 Option; 1230 Change

FIG. 12

SYSTEMS AND METHODS FOR UPDATING A USER INTERFACE FOR A PRINTING DEVICE

CROSS REFERENCE TO RELATED APPLICATIONS

This application is a continuation-in-part of U.S. application Ser. No. 13/010,460, filed on Jan. 20, 2011, which is incorporated by reference in its entirety.

BACKGROUND

1. Field of the Disclosure

The present disclosure relates generally to updating user interfaces for a printing device.

2. Description of the Related Art

In the field of print processing, it is a challenging task for Independent Software Vendors (also referred to herein as "ISVs") to provide a consistent user interface for receiving a desired print intent from a user while supporting private settings for the printers of multiple Independent Hardware Vendors (also referred to herein as "IHVs"). The communication between the Windows® print sub system, an IHV's plug-in driver, and an ISV's application causes part of the difficulties, because the communication is done thru indexed based binary DevMode and binary DevCaps.

Microsoft® introduced a new XML based print schema to address the problems associated with communication between the print subsystem and external applications. The print schema technology uses an XML based public schema to describe printer capabilities, device configuration, and job formatting settings. Applications can use the XML based schema to provide print dialogs to change print settings. Whenever a user changes a selected option for a setting, the changed setting and the respective option is added to a delta (also referred to herein as "Δ") PrintTicket and merged and validated with a specified base PrintTicket to produce a resulting PrintTicket, which is used to get a corresponding resulting PrintCapabilities document. The resulting PrintCapabilities document is then used to re-populate the user interface (also referred to herein as a "UI").

SUMMARY

In one embodiment, a method for updating a user interface that indicates printing capabilities for a printing device comprises reading one or more first printing capabilities from first printing capabilities data, generating a user interface including a plurality of interface elements, wherein one or more interface elements of the plurality of interface elements are associated with the one or more first printing capabilities, reading one or more second printing capabilities from second printing capabilities data, the one or more second printing capabilities including at least one printing capability different from the one or more first printing capabilities, generating delta printing capabilities data indicating changed printing capabilities based on the one or more first printing capabilities and the one or more second printing capabilities, wherein the delta printing capabilities data includes the at least one printing capability different from the one or more first printing capabilities, and updating the one or more interface elements associated with the changed printing capabilities indicated by the delta printing capabilities data, including the at least one printing capability different from the one or more first printing capabilities, wherein at least one interface element is independent from the changed printing capabilities.

In one embodiment, a device for updating a user interface that indicates print capabilities for a printing device comprises a computer readable storage device, an output interface configured to communicate with a printing device, a display interface configured to communicate with a display device, and one or more processors configured to execute one or more modules. The device further comprises a print capabilities module configured to read one or more first print capabilities of an associated printing device from first print capabilities data, generate a user interface including a plurality of interface elements, wherein one or more interface elements of the plurality of interface elements are associated with the one or more first print capabilities, read one or more second print capabilities from second print capabilities data, the one or more second print capabilities comprising at least one print capability different from the one or more first print capabilities, generate delta print capabilities data indicating changed print capabilities based on the first print capabilities and the second print capabilities, wherein the delta print capabilities data includes the at least one print capability different from the one or more first print capabilities, and update the one or more interface elements associated with the changed print capabilities indicated by the delta print capabilities data, including the at least one print capability different from the one or more first print capabilities.

In one embodiment, a computer-readable storage medium stores instructions that, when executed by one or more computing devices, cause the one or more computing devices to perform operations comprising reading base print capabilities from base print capabilities data, generating a print dialogue interface including one or more fields associated with respective print capabilities, wherein the respective print capabilities are set to the base print capabilities, reading one or more updated print capabilities from updated print capabilities data, and determining different print capabilities based on the base print capabilities and the updated print capabilities. The operations further comprise updating one or more fields in the print dialogue interface that are associated with the different print capabilities, and maintaining one or more fields in the print dialogue interface that are not associated with the different print capabilities.

BRIEF DESCRIPTION OF THE DRAWINGS

FIG. 9 illustrates an example embodiment of delta print capabilities data.

FIG. 12 illustrates an example embodiment of delta print capabilities data.

DETAILED DESCRIPTION

Though the following description is of certain illustrative embodiments alternatives, equivalents, and modifications are included within the scope of the claims. Additionally, the illustrative embodiments may include several novel features, and a particular feature may not be essential to practice the systems and methods described herein.

Figure 1:
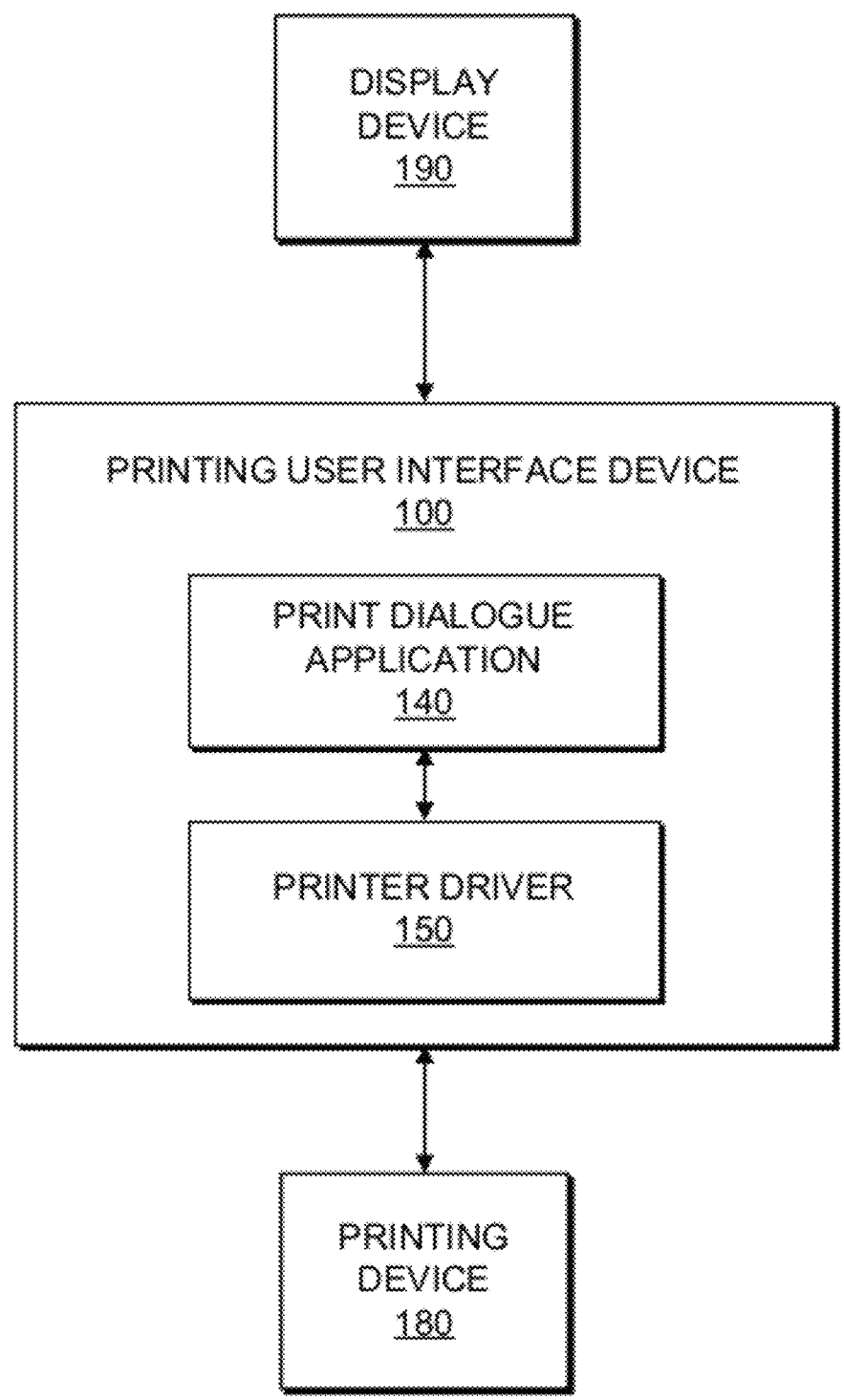
FIG. 1 is block diagram illustrating a system for updating a user interface.

FIG. 1 is block diagram illustrating an embodiment of a system for updating a user interface. The system includes a printing user interface device 100, a printing device 180, and a display device 190. The devices in the system may communicate via wired or wireless channels. The display device 190 has a display that is capable of rendering images, and the printing device 180 is configured to receive data and print images (e.g., text, graphics, photographs) on one or more print media (e.g., paper, cardboard, plastic) based on the received data. The printing device 180 may operate and print the images on the print media based on one or more settings.

A user and the printing device 180 communicate via the printing user interface device 100. Information is presented to the user via the display device 190, including information sent by the printing device 180. The printing user interface device 100 receives user provided information (e.g., user selections) and relays the information to the printing device 180.

The printing user interface device 100 includes a print dialogue application 140 and a printer driver 150. The print dialogue application 140 generates a user interface that presents information to the user and that receives information from the user. The user interface may present the information in the form of a graphical interface that shows printer settings and capabilities and that receives user selections, such as selections of an option for a respective setting. The information may also be presented in any other manner that allows a user to view the information and/or select one or more options. The display device 190 presents the user interface to the user.

The printer driver 150 receives information, performs requested operations, and returns requested information (if any). For example, the print dialogue application 140 invokes the functionality of the printer driver 150 via a function call, passes information to the printer driver 150 in the form of parameters of the function call, and receives the information returned by the printer driver 150. The interaction between the print dialogue application 140 and the printer driver 150 may conform to an application programming interface.

The printer driver 150 may convert received information into a format readable by the printing device 180. For example, the printer driver 150 may receive a print job from a software application, convert the print job into PDL data for the printing device 180, and transmit the PDL data to the printing device 180. The printer driver 150 also communicates with the printing device 180 about the status of the printing device (e.g., paper, level, ink level, toner level, errors, selected paper size, colors).

The printer driver 150 also adjusts the configuration of the settings of the printing device 180 and tracks the capabilities of the settings. Settings include, but are not limited to, media size, borderless printing, duplexing, media type, resolution, colors, orientation, copying, collating, media quality, print quality, and margins. An option defines a configuration for a setting (e.g., gray scale is an option for color, letter size is an option for media size, landscape is an option for orientation), and a set of some or all of the available options for a setting are the capabilities of the respective setting.

The printer driver 150 may be configured with the relationships between the settings, capabilities, and the selected settings options of the printing device 180. Thus, the printer driver 150 can determine which print capabilities are or are not available based on the selected options of one or more settings and determine which setting options are constrained based on the selected options of one or more other settings.

For example, the printing driver 150 may be configured with the priorities of different settings and adjust printer capabilities according to selected options for the settings. Thus, if the selected option of a lower priority setting is changed, the printer driver 150 does not change the capabilities of the higher priority settings. However, if the selected option of a higher priority setting is changed, the printer driver 150 adjusts the capabilities of the lower priority settings, if necessary.

Following the above example, a printer driver may be configured to assign the medium size setting a lower priority than the medium type setting or the borderless printing setting. Thus, if the selected option for the medium size setting is changed, the capabilities for the medium type or borderless printing settings will not be changed because they are a higher priority. However, if the option selected for the medium type setting or the borderless printing setting is changed, then the capabilities for the medium size (and other lower priority settings) will be changed, if necessary.

Figure 2:
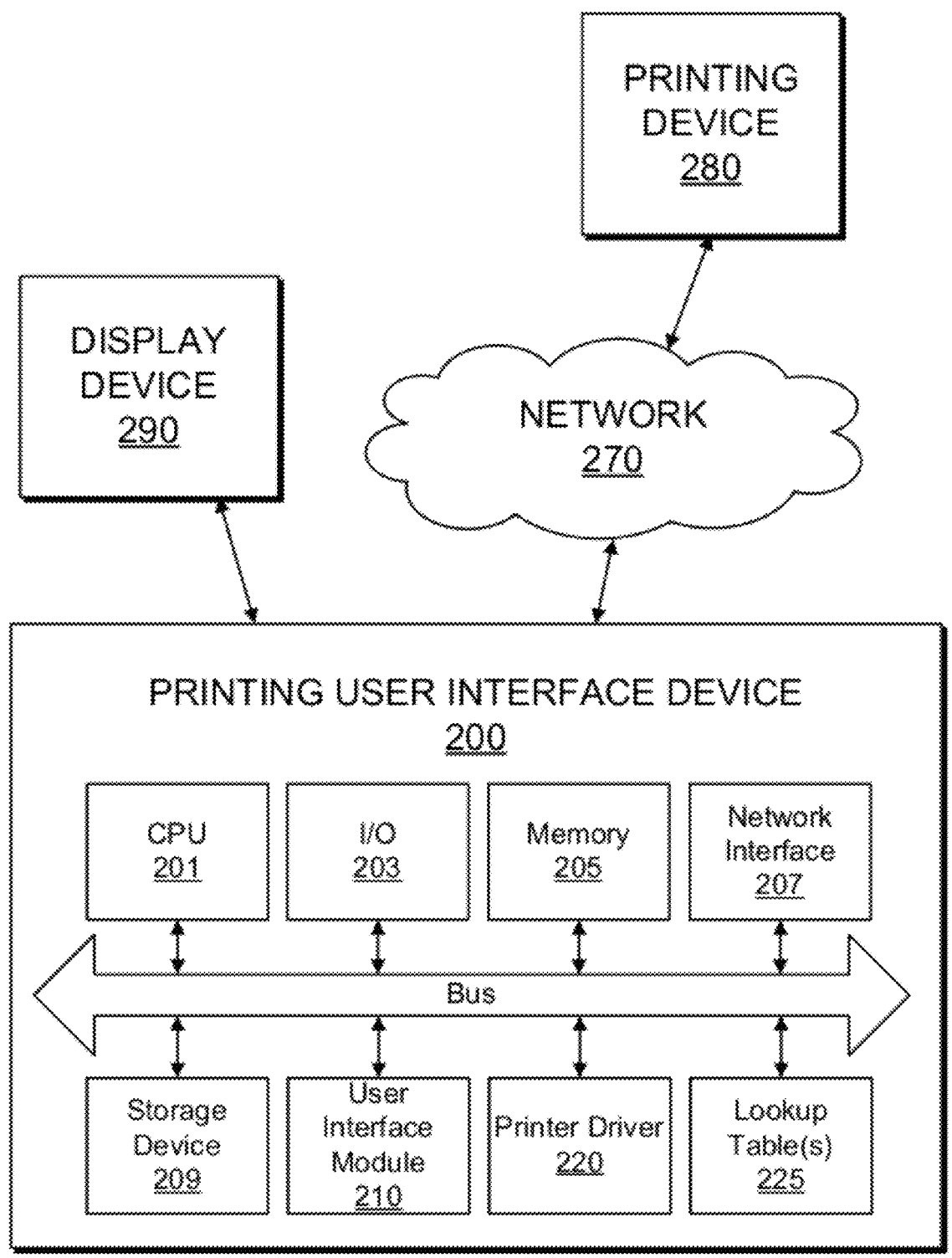
FIG. 2 is a block diagram illustrating an embodiment of a printing user interface device.

FIG. 2 is a block diagram illustrating an embodiment of a printing user interface device 200 in communication with a display device 290 and a printing device 280. The printing user interface device 200 communicates with the printing device 280 via the network 270, and the printing user interface device 200 may also communicate with one or more other devices via the network 270 as well, such as the display device 290. The network 270 may include any combination of one or more networks, including the Internet, WANs, and LANs, and any combination of wired or wireless networks.

The printing user interface device 200 includes one or more processors 201 (also referred to herein as "CPU 201"), which may be a conventional or customized microprocessor(s). The CPU 201 is configured to read and execute computer readable instructions, and the CPU 201 may command/and or control other components of the printing user interface device 200.

The printing user interface device 200 also includes I/O interfaces 203, which provide communication interfaces to other devices, including a keyboard, a display device, a mouse, a printing device, a touch screen, a light pen, an optical storage device, a scanner, a microphone, a camera, etc. The printing user interface device 200 also includes memory 205, which may be volatile or non-volatile, such as ROM, RAM, and flash memory. The printing user interface device 200 further includes a network interface 207 that allows the printing user interface device 200 to communicate with the network 270. The storage device 209 stores data or modules and may include, for example, a hard drive, an optical storage device, a diskette, and/or a solid state drive. The components of the printing user interface device 200 are connected via a bus. The printing user interface device 200 includes an operating system, which manages the hardware, the processes, the interrupts, the memory, and/or the file system of the printing user interface device 200.

The printing user interface device 200 also includes a user interface module 210, a printer driver 220, and lookup table(s) 225. A module may be executed by the printing user interface device 200 to cause the printing user interface device 200 to perform certain operations, though for ease of description a module may be described as performing the operations. Modules may include logic and/or computer readable instructions and may be implemented in software, firmware, and/or hardware. In other embodiments, the printing user interface device 200 may include more or less modules, the modules may be combined into fewer modules, or the modules may be divided into more modules.

The user interface module 210 includes instructions that, when executed, cause the printing user interface device 200 to generate a user interface that includes printing information, such as printing device settings and capabilities. The user interface may include any combination of text and graphics and may receive data from a user, such as via a text field or by user selection of a control on the interface (e.g., a menu, a button, a check box). As discussed above, the printer driver 220 communicates with a printing device (e.g., printing device 280). The user interface module 210 may implement the print dialogue application, as discussed above. In the embodiment shown in FIG. 2, the printing user interface device 200 also includes lookup table(s) 225. The lookup table(s) 225 includes information about printing device settings, and the printing user interface device 200 may use the lookup table(s) to determine changes to the capabilities of one or more settings in response to a change in the selected option of one or more settings of the printing device 280.

For example, the lookup table(s) 225 may map selected print options to print capabilities (e.g., map a PrintTicket to a PrintCapabilities). The lookup table(s) 225 may include a column for each setting (e.g., media size, media type, color, duplexing, stapling, font) and each capability and row for each permutation of setting options, and a row of the lookup table may indicate the printing capabilities for a printing device when the printing device is set to the settings options indicated in the respective row. In other embodiments, the printing user interface device 200 determines changes in print capabilities by other means, including logic, data trees, etc.

Figure 3:
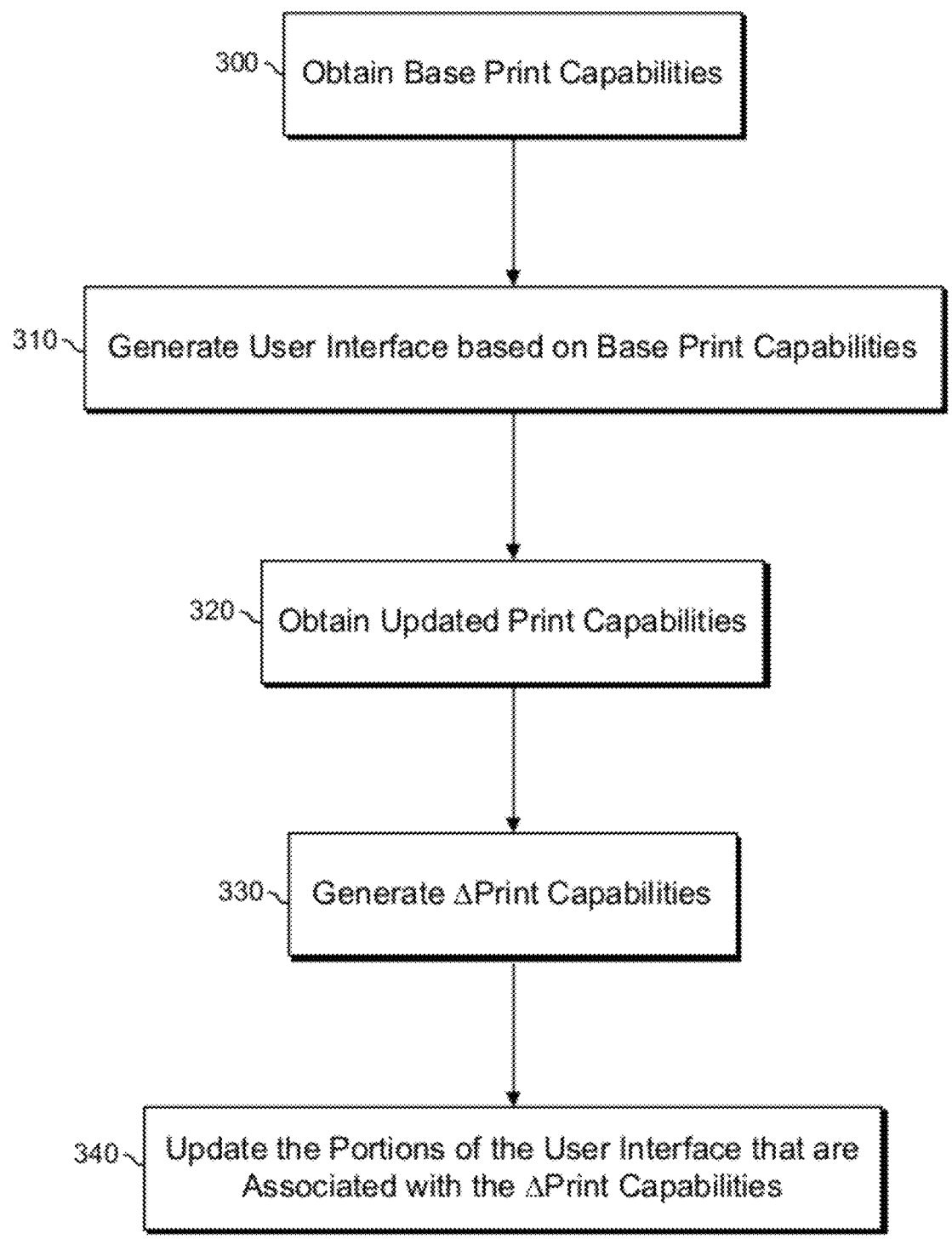
FIG. 3 is a flowchart illustrating an embodiment of a method for updating a user interface.

FIG. 3 is a flowchart illustrating an embodiment of a method for updating a user interface. Other embodiments of this method and the other methods described herein may omit blocks, may add blocks, may change the order of the blocks, may combine blocks, and/or may divide blocks into separate blocks. Additionally, the components of the printing user interface device 200 (e.g., the user interface module 210, the printer driver 220, the lookup table(s) 225) may implement the method shown in FIG. 3 and the other methods described herein.

Beginning in block 300, base print capabilities are obtained, for example, from a printer driver. The base print capabilities may be associated with base print settings options. Additionally, the base print capabilities may be received from a printer driver, such as in response to providing print settings data (e.g., an object, a file, a pointer, a data structure), which defines one or more base print settings options, to a printer driver. The print settings data may be provided to the printer driver in the form of markup language data, and, in some embodiments, the data is a PrintTicket. The base print capabilities may be obtained from the driver in the form of markup language data, and may be in the form of a PrintCapabilities.

Next, in block 310 a user interface is generated based on the base print capabilities, and when displayed the user interface presents one or more of the base print capabilities to the user. The selected options for one or more print settings may also be displayed. The method proceeds to block 320, where updated print capabilities are obtained, such as after one or more of the selected options for the print settings are changed. For example, the updated print capabilities may be received from the printer driver, such as in response to calling the printer driver and passing the printer driver data that includes the updated selected options for the print settings. In one embodiment, the data that includes the updated selected options for the print settings is a PrintTicket (e.g., a delta PrintTicket). The printer driver may return data that includes only updated print capabilities and/or that identifies the updated print capabilities, for example by tagging the updated print capabilities or storing the updated print capabilities in a predetermined location in the data.

Once the updated print capabilities are obtained, in block 330 Δprint capabilities are generated that indicate the differences between the base print capabilities and the updated print capabilities, such as by comparing the base print capabilities with the updated print capabilities. The Δprint capabilities for specific updated print settings options (e.g., a ΔPrintTicket) may be generated using lookup tables, hash tables, document object models, grammars, DevCaps structures, DevMode structures, etc., and the generation may involve parsing, text comparison, binary comparison, hashing, etc.

Finally, in block 340, one or more portions of the user interface that are associated with the Δprint capabilities are updated, and the other portions of the user interface may be maintained. Thus, only part of the user interface may be updated in response to a change in print capabilities, in particular the part of the user interface that displays the changed print capabilities. Furthermore, if there are no changes to the print capabilities then there may be no updates to the user interface.

Figure 4:
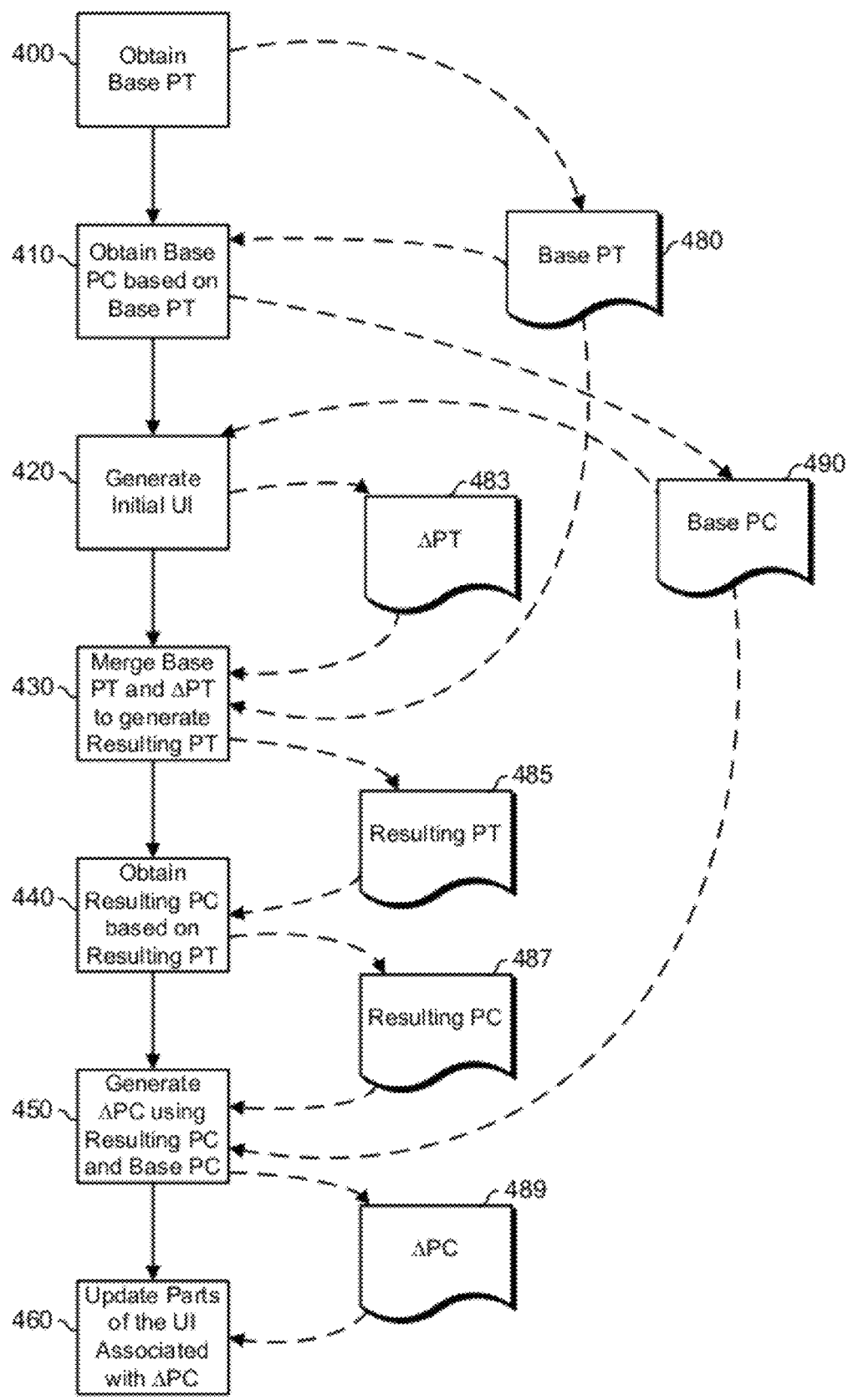
FIG. 4 is a flowchart illustrating an embodiment of a method for updating a user interface.

FIG. 4 is a flowchart illustrating an embodiment of a method for updating a user interface. Beginning in block 400, base print settings data 480 is obtained. Print settings data may include text-based data. Text-based data includes markup language data (e.g., XML, HTML, SGML, XHTML). An example of print settings data that includes XML is a PrintTicket. Also, print capabilities data may include text-based data. An example of print capabilities data that includes XML is a PrintCapabilities document.

In this illustrative embodiment, the base print settings data 480 is a base PrintTicket 480 ("base PT 480"). Also, by way of illustration and not limitation, in this embodiment other print settings data are PrintTickets and other print capabilities data are PrintCapabilities, though other embodiments of this method may not include PrintTickets and PrintCapabilities. The base PT 480 is used to obtain the base PrintCapabilities 490 ("base PC 490"). For example, the base PT 480 may be passed to a printer driver and the printer driver may return the base PC 490. Next, in block 420, an initial user interface is generated. The initial user interface may include one or more of the print settings and respective selected options in the base PT 480 and respective one or more of the base print capabilities in the base PC 490. A user may change one or more selected options of the print settings via the user interface, and the selected options may be added to a delta PrintTicket 483 ("ΔPT 483").

Proceeding to block 430, the base PT 480 is merged and validated with the ΔPT 483 to generate a resulting PrintTicket ("resulting PT 485"). Thus, the resulting PT 485 integrates the changed settings with the base settings. Next, in block 440, the resulting PT 485 is used to obtain the resulting PrintCapabilities 487 ("resulting PC 487"). The resulting PC 487 indicates the print capabilities that are available while the associated printing device is configured according to the selected options in the resulting PT 485.

Moving to block 450, a delta print capabilities 489 ("ΔPC 489") is generated based on the resulting PC 487 and the base PC 490. The resulting PC 487 may be compared with the base PC 490 to determine the changes in print capabilities, and the changed capabilities are added to the ΔPC 489. The ΔPC 489 may indicate no changes, one change, or a plurality of changes, depending at least in part on the changes to the selected options for the print settings in the ΔPT 483 and on the printing device. In block 460, the parts of the user interface that are associated with the changed print capabilities in the ΔPC 489 are accordingly updated. The parts of the user interface that are not associated with the changed print capabilities may be maintained in their current state, thus avoiding unnecessary changes to the user interface, which may save time and computing resources.

Figure 5:
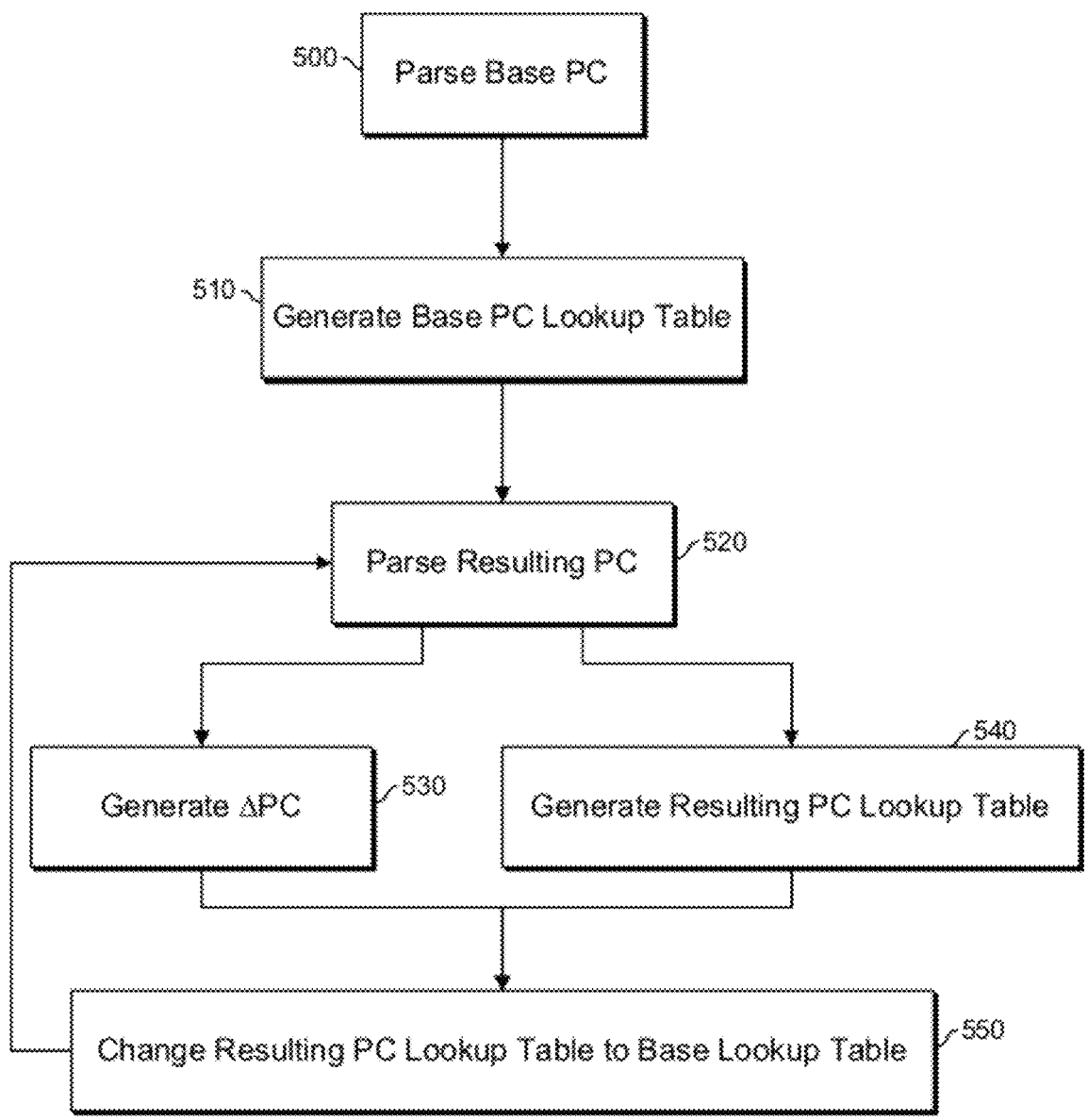
FIG. 5 is a flowchart illustrating an embodiment of a method for generating delta print capabilities.

FIG. 5 is a flowchart illustrating an embodiment of a method for generating delta print capabilities. Though this embodiment describes the use of PrintTickets and PrintCapabilities, other embodiments of the method may not use PrintTickets and PrintCapabilities to generate delta print capabilities. In block 500, base PC data is parsed. For example, an XML parser (e.g., a SAX parser) may be used to parse the base PC and generate a document object model (also referred to herein as a "DOM"). Next, in block 510, a base PC lookup table is generated. The base PC lookup table may include one or more of the print capabilities included in the base PC. In one embodiment, a lookup table entry includes a markup element name, a pointer to the XML string of the markup element node, and the length of the string from the document object model. Other embodiments of the lookup table may include additional, less, and/or different fields.

Proceeding to block 520, resulting PC data is parsed. In block 530, a ΔPC is generated. To generate the ΔPC, in one embodiment, upon receiving the start indicator of each markup element from the parser, a markup element name and stream pointer to the markup element are retrieved and pushed onto a stack. When an end markup element indicator is received, the markup element name and stream pointer are popped from the stack, and the corresponding node (if any) is found in the base PC lookup table. The XML string of the base PC element node is then compared with the XML string of the resulting PC element node. If a difference is found, the element node is added to a ΔPC DOM and the entry is removed from the base PC lookup table. If no difference is found, then the entry is removed from the base PC lookup table and the markup element node is not added to the ΔPC DOM. This proceeds until the end document indicator is reached, and ΔPC is generated using the ΔPC DOM.

Also, in block 540 a resulting PC lookup table is generated. Block 540 is performed by building a resulting PC DOM upon receiving each event from the parser and building a lookup table that refers to the resulting PC DOM. Blocks 530 and 540 may be performed during a single parsing of the resulting PC, and thus may be performed substantially simultaneously. Finally, in block 550 the resulting PC lookup table is identified as the base PC lookup table. Thus, if another resulting PC is received, flow returns to block 520 and the resulting print capabilities from the previous iteration are used as the base print capabilities when generating a ΔPC for the next iteration.

Figure 6:
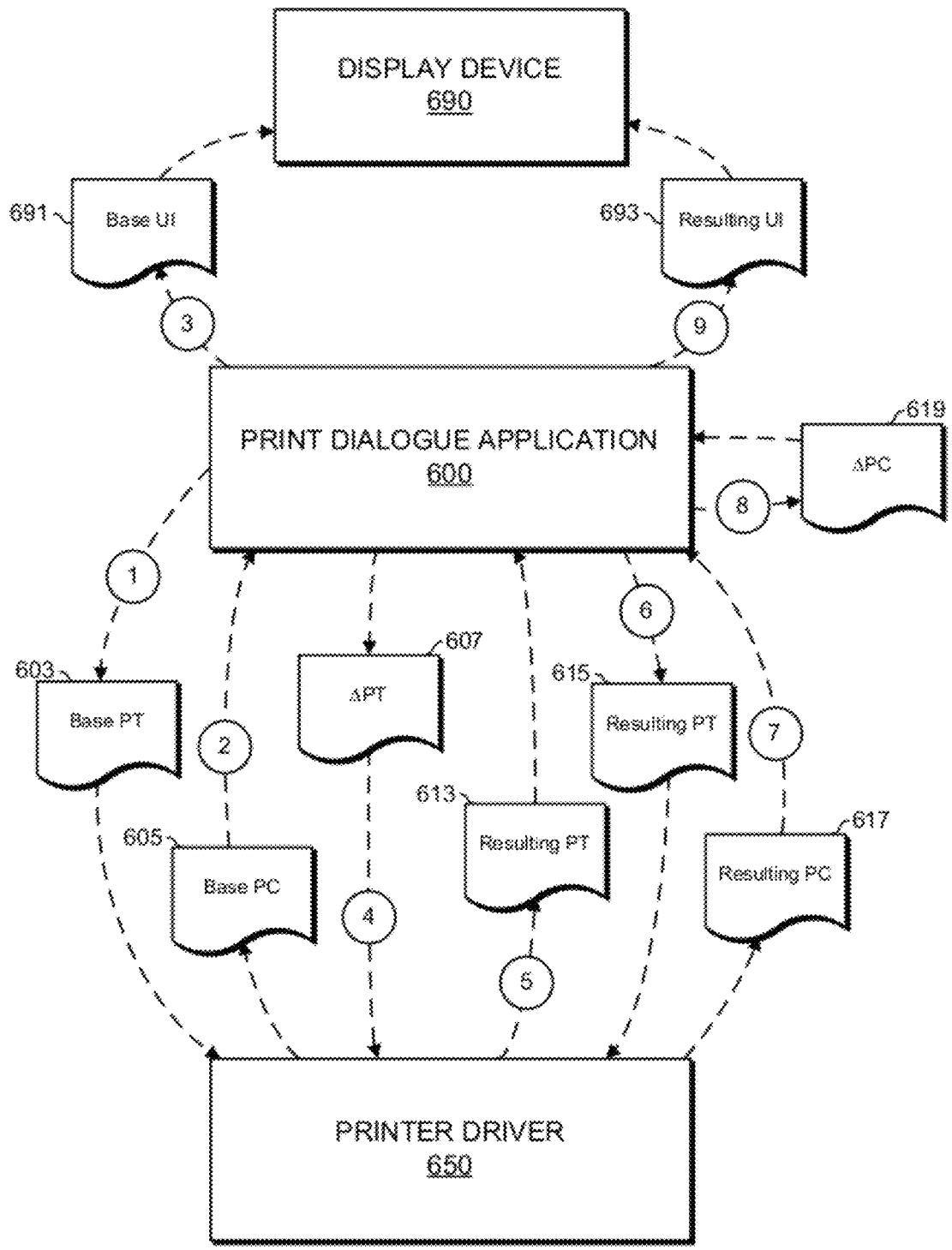
FIG. 6 is a block diagram illustrating an embodiment of a system for updating a user interface and the flow of data in the system.

FIG. 6 is a block diagram illustrating an embodiment of a system for updating a user interface and the flow of data in the system. First, in stage 1, a print dialogue application 600 passes a base PT 603 to printer driver 650. Next, in stage 2, the printer driver 650 generates a base PC 605 and returns it back to the print dialogue application 600. The print dialogue application 600 then generates a base UI 691 based on the base PT 603 and the base PC 605 and, in stage 3, transmits the base UI 691 to a display device 690.

In stage 4 the print dialogue application 600 passes a ΔPT 607 to the printer driver 650. The printer driver 650 merges the ΔPT 607 with the base PT 603, validates the merged ΔPT 607 and base PT 603, and, in stage 5, returns the resulting PT 613. The print dialogue application then passes the resulting PT 615 to the printer driver 650 in stage 6, for example in a function call to get updated printing capabilities. The printer driver 650 determines the resulting PC 617 and, in stage 7, passes the resulting PC 617 back to the print dialogue application 600. In Stage 8, the print dialogue application 600 generates a ΔPC 619 from the base PC 605 and the resulting PC 617. Using the ΔPC 619, the print dialogue application 600 then modifies the parts of the UI that correspond to the print capabilities in the ΔPC 619 to generate a resulting UI 693. Finally, in stage 9 the print dialogue application 600 passes the resulting UI 693 to the display device 690.

In some embodiments, the print dialogue application 600 operates on a local computing device and the printer driver operates on a remote distributed computing service (e.g., a Cloud). The data in stages 1, 2, 4, 5, 6, and 7 is transmitted between the print dialogue application 600 and the printer driver 650 via one or more networks.

Figure 7:
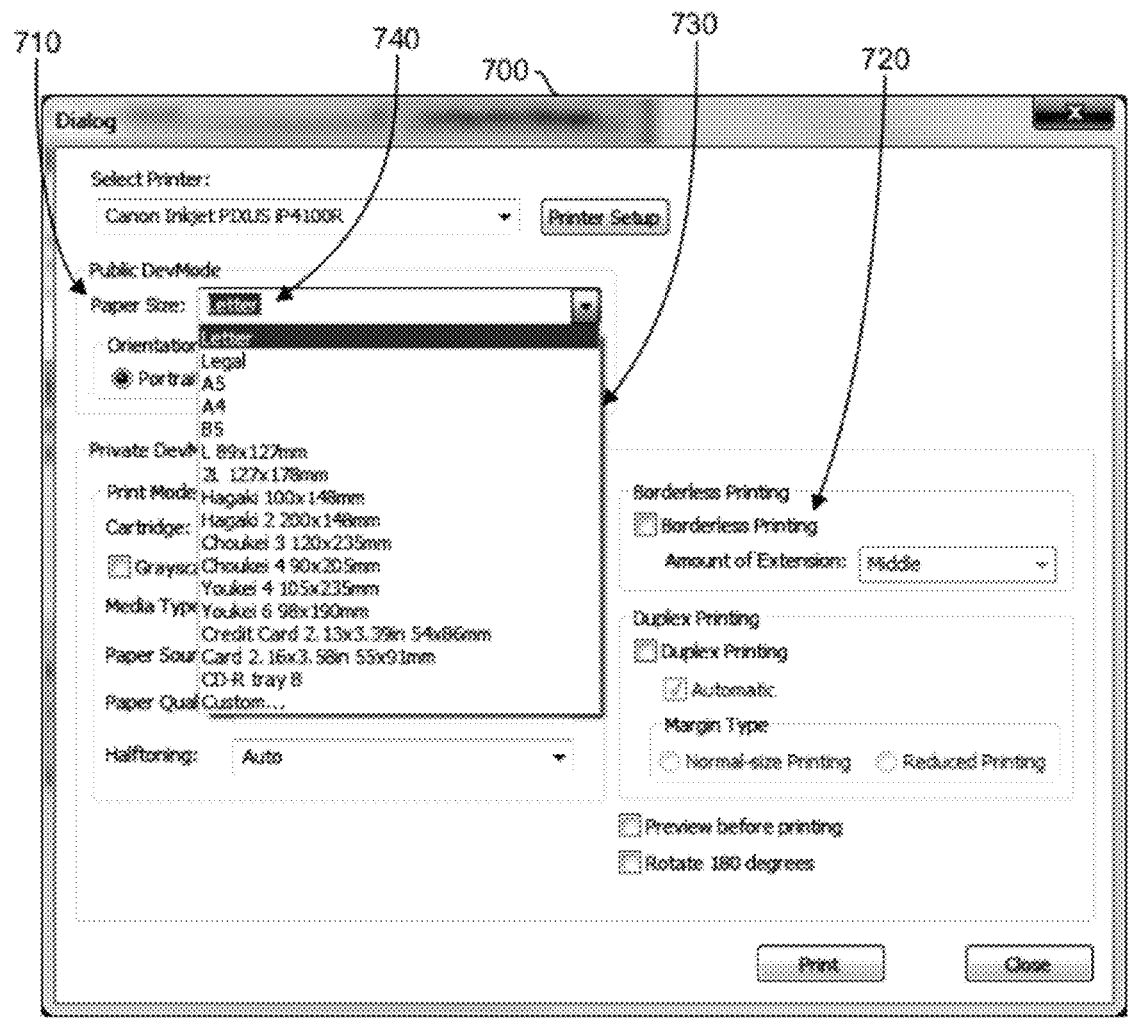
FIG. 7 illustrates an example embodiment of a user interface.

FIG. 7 illustrates an example embodiment of a user interface 700. The user interface 700 includes a plurality of settings, which include paper size 710, orientation, print mode, grayscale, media type, paper source, paper quality, halftoning, borderless printing 720, duplex printing, margin type, and rotate 180 degrees. The user interface 700 displays the capabilities 730 for the paper size 710 and the selected option 740 (Letter) of the paper size 710. When the options for the settings are set as shown by the user interface 700, the capabilities 730 for the paper size 710 include Letter, Legal, A5, A4, B5, etc. Thus, when the option for borderless printing 720 is set to "off," the capabilities 730 for the paper size 710 are as shown in the user interface 700. However, if borderless printing 720 is set to "on" and borderless printing 720 has a higher priority than paper size 710, then the capabilities 730 for the paper size 710 change, as discussed below in reference to FIG. 8.

Figure 8:
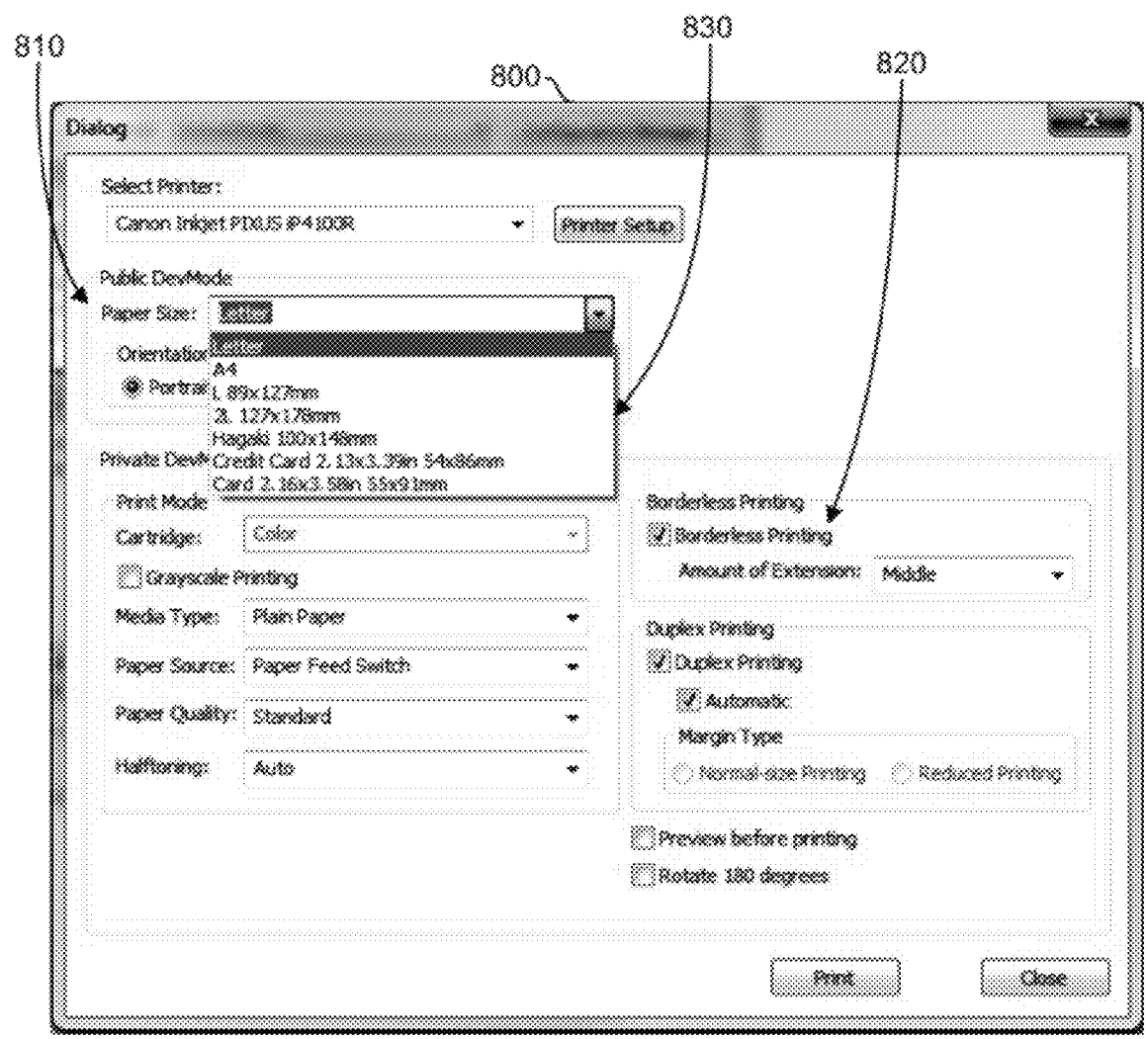
FIG. 8 illustrates an example embodiment of a user interface.

FIG. 8 illustrates an example embodiment of a user interface 800, which shows the capabilities 830 of the paper size 810 when borderless printing 820 is set to "on" and has a higher priority than paper size 810. The capabilities 830 now provide seven options: Letter, A4, L 89×127 mm, 2L 127×178 mm, Hagaki 100×148 mm, Credit Card 2.13×3.39 in 54×86 mm, and Card 2.16×3.58 in 55×91 mm.

Therefore, in this embodiment, if the base print settings data (e.g., Base PT 603) indicates that the initially selected option for borderless printing is "off," the base print capabilities data (e.g., Base PC 605) generated based on the base printing settings data (e.g., Base PT 603) will indicate that the capabilities for the paper size setting are Letter, Legal, A5, A4, B5, L 89×127 mm, 2L 127×178 mm, Hagaki 100×148 mm, Hagaki 2 200×148 mm, Choukei 3 120×235 mm, Choukei 4 90×205 mm, Youkei 4 105×235 mm, Youkei 6 98×190 mm, Credit Card 2.13×3.39 in 54×86 mm, Card 2.16×3.58 in 55×91 mm, CD-R tray B, and Custom. If a user sets borderless printing to "on" via the user interface, delta print setting data (e.g., ΔPT 607) is generated that indicates that the option for borderless printing is changed to "on." The delta print setting data (e.g., ΔPT 607) is sent to the printer driver, which returns updated print settings data (e.g., Resulting PT 613). The updated print settings data (e.g., Resulting PT 615) is then sent to the printer driver with a request for updated print capabilities data. The print driver generates the corresponding updated print capabilities data (e.g., resulting PC 617), which indicates that the print capabilities for the paper size are letter, A4, L 89×127 mm, 2L 127×178 mm, Hagaki 100×148 mm, Credit Card 2.13×3.39 in 54×86 mm, and Card 2.16×3.58 in 55×91 mm.

The print dialogue application then generates delta print capabilities data (e.g., ΔPC 619) based on the base print capabilities data (e.g., Base PC 605) and the updated print capabilities data (e.g., Resulting PC 617). The delta print capabilities data (e.g., ΔPC 619) indicates that the print capabilities for the paper size setting have changed to no longer include Legal, A5, B5, Hagaki 2 200×148 mm, Choukei 3 120×235 mm, Choukei 4 90×205 mm, Youkei 4 105×235 mm, Youkei 6 98×190 mm, CD-R tray B, and Custom. A resulting user interface (e.g., resulting UI 693) may then be generated that changes substantially only the portions of the user interface corresponding to the modified print capabilities (e.g., removes the paper size options that are no longer available) and any modifications to the selected options (e.g., shows borderless printing is set to "on"), and maintains the remainder of the user interface.

FIG. 9 illustrates an example embodiment of delta print capabilities data 900, based on FIG. 7 and FIG. 8. The delta print capabilities data 900 indicates settings that have changed capabilities (i.e., the Page Size setting), the options in the capabilities that have changed, and the respective change made to the options. The delta print capabilities data 900 is formatted as an XML document, and the change for each of the options in the capabilities indicates that the respective option is no longer available (though if options were now available the print capabilities data 900 would indicate that the options were available). The delta print capabilities data 900 indicates that there is a change to the capabilities for the Paper Size setting, in particular that the Legal, A5, B5, Hagaki 2 200×148 mm, Choukei 3 120×235 mm, Choukei 4 90×205 mm, Youkei 4 105×235 mm, Youkei 6 98×190 mm, CD-R tray B, and Custom sizes are no longer available.

Figure 10:
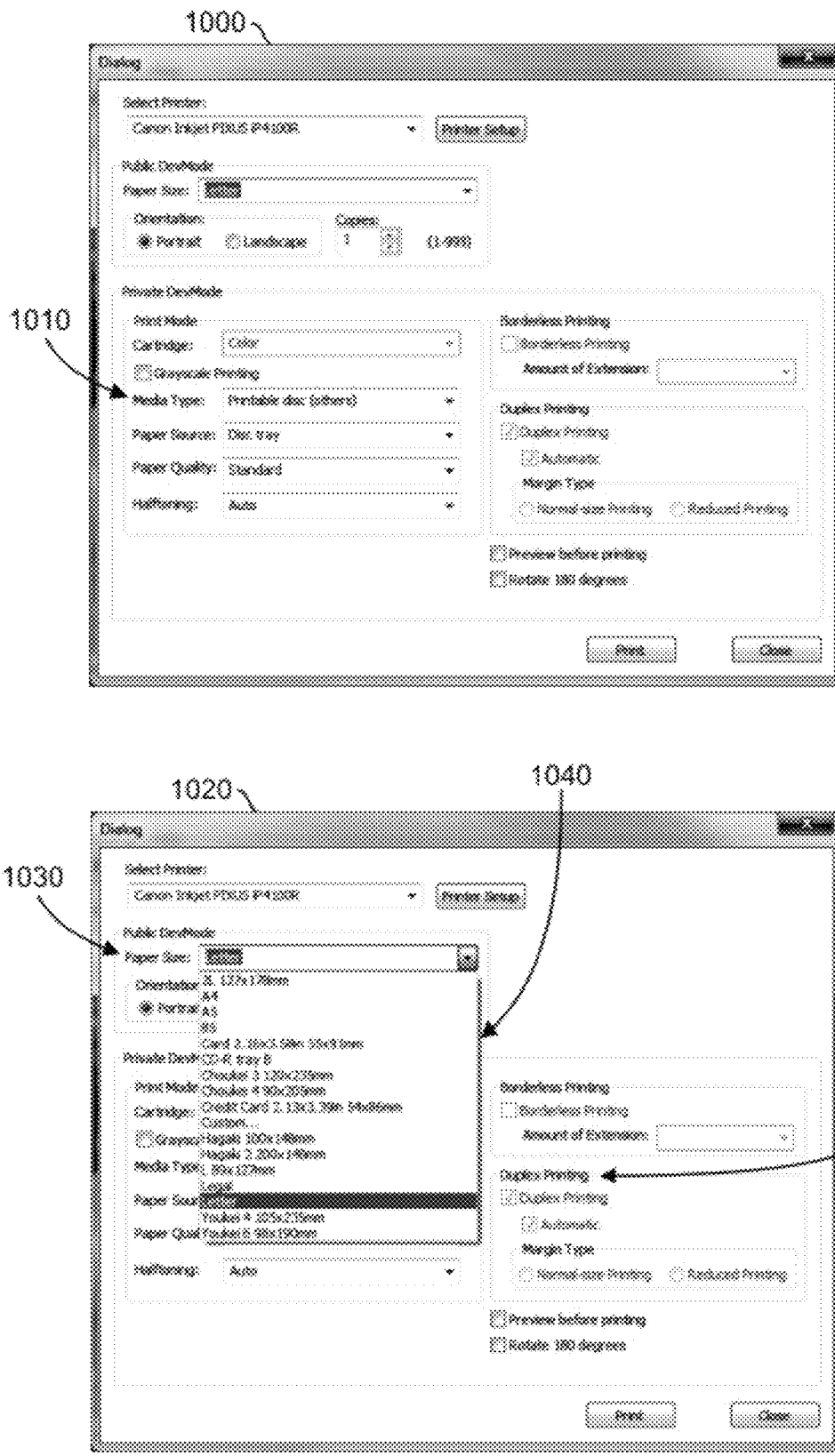
FIG. 10 illustrates an example embodiment of a user interface.

FIG. 10 illustrates an example embodiment of a user interface. A first view of the user interface 1000 shows that the option for the media type setting 1010 has been set to Printable disc (others), and a second view of the user interface 1020 shows the corresponding capabilities 1040 for the Paper Size setting 1030. The second view of the user interface 1020 also shows that the capabilities for the Duplex Printing setting 1050 are grayed-out, and thus the capabilities for the Duplex Printing setting 1050 are not available to be a selected option. However, if a different option for the Media Type setting 1010 is selected, at least some of the print capabilities change, as is shown in FIG. 11.

Figure 11:
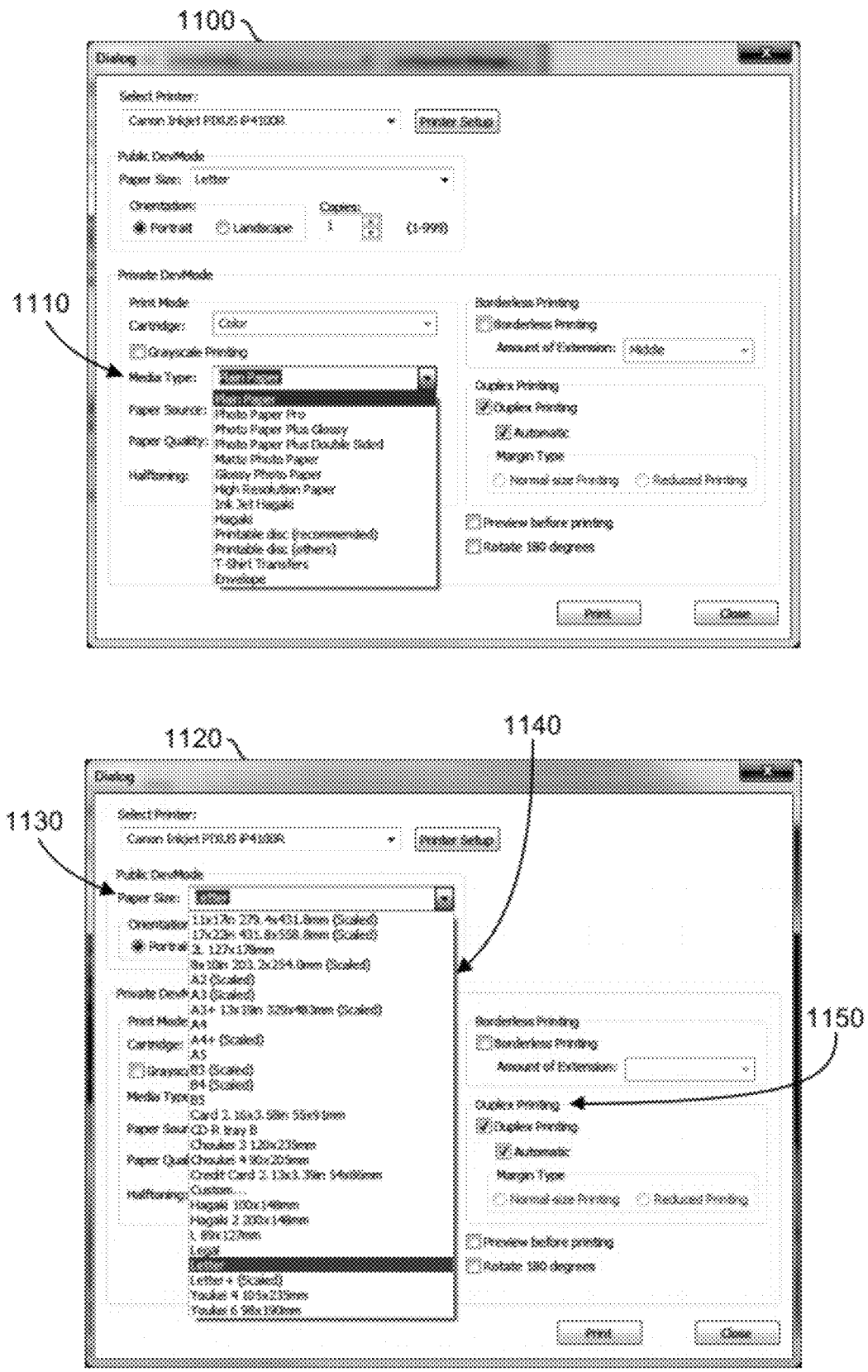
FIG. 11 illustrates an example embodiment of a user interface.

FIG. 11 illustrates an example embodiment of a user interface, continuing the example of FIG. 10. A first view of the user interface 1100 shows the selected option for the Media Type setting 1110 has been set to Plain Paper. A second view of the user interface 1120 shows that, for the Paper Size setting 1130, the capabilities 1140 have changed to add options. Also, for the Duplex Printing setting 1150, the capabilities have changed to include the options Duplex Printing "on," Duplex Printing "off," automatic "on," and automatic "off" ("on" and "off" being indicated by the check boxes).

FIG. 12 illustrates an example embodiment of delta print capabilities data 1200, based on FIG. 10 and FIG. 11. The delta print capabilities data 1200 is arrange in a table format and indicates settings 1210 that have changed capabilities (i.e., the Page Size setting), the options 1220 that have changed, and the respective change 1230 made to the options. Thus, the delta print capabilities data 1200 indicates that, based on the change in the selected option for Media Type from FIG. 10 to FIG. 11, the options in the capabilities 1220 are now available.

The above described systems and methods can be achieved by supplying a storage medium having computer-executable instructions for realizing the above-described operations to one or more computing devices (e.g., CPU, MPU) that may read the computer-executable instructions stored in the storage medium and execute them.

In this case, the computer-executable instructions when read from the storage medium and performed by the one or more computing devices execute the operations of the above described embodiments. Thus, the computer-executable instructions or the storage medium storing the computer-executable instructions therein constitute an embodiment.

Any applicable computer-readable storage medium (e.g., a floppy disk, a hard disk, an optical disk, a magneto-optical disk, a CD-ROM, a CD-R, a magnetic tape, a non-volatile memory card, a ROM) can be employed as a storage medium for supplying the computer-executable instructions.

The computer-executable instructions may be stored in a memory provided on a function-extension board inserted into the computing device or on a function-extension unit connected to the computing device, and a CPU provided on the function-extension board or unit may carry out part or all of the actual processing that realizes the operations of the above-described embodiments. Furthermore, when the computer-executable instructions are executed by the one or more computing devices, an operating system working on the computing system may carry out part or all of the actual processing that realizes the operations of the above described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. A method for comparing print capabilities, the method comprising:
    sending first print setting options data to a printer driver, wherein the first print setting options data define first selected options for print settings of a printing device;
    receiving first print capabilities data from the printer driver, wherein the first print capabilities data were generated based on the first print setting options data;
    generating, based on the first print capabilities data, a base print capabilities lookup table that includes one or more first print capabilities of the print settings of the printing device;
    sending second print setting options data to the printer driver, wherein the second print setting options data define second selected options for the print settings of the printing device;
    receiving second print capabilities data from the printer driver, wherein the second print capabilities data were generated based on the second print setting options data, and wherein the second print capabilities data include at least one print capability different from the one or more first print capabilities; and
    parsing the second print capabilities data to read respective print capabilities for each print setting in the second print capabilities data and, while parsing the second print capabilities data,
        finding print capabilities of a just-read print setting in the base print capabilities lookup table, and comparing the print capabilities of the just-read print setting in the second print capabilities data to the print capabilities of the just-read print setting in the base print capabilities lookup table, and when a difference is found, generating delta print capabilities data indicating the difference between the print capabilities of the just-read print setting in the second print capabilities data and the print capabilities of the just-read print setting in the base print capabilities lookup table.

2. The method of claim 1, wherein the first print capabilities data comprise markup language data, the second print capabilities data comprise markup language data, and the delta print capabilities data comprise markup language data.

3. The method of claim 1, further comprising updating a user interface based on the delta print capabilities data.

4. The method of claim 3, wherein parts of the user interface that are associated with the different print capabilities that are included in the delta print capabilities data are modified, and wherein parts of the user interface that are not associated with the different print capabilities that are included in the delta print capabilities data are not modified.

5. The method of claim 1, further comprising
adding the print capabilities of the just-read print setting to a resulting print capabilities lookup table while parsing the second print capabilities data; and
after parsing the second print capabilities data, designating the resulting print capabilities lookup table as the base print capabilities lookup table.

6. One or more non-transitory computer-readable media storing instructions that, when executed by one or more computing devices, instruct the one or more computing devices to perform operations comprising:
sending first print setting options data to a printer driver, wherein the first print setting options data define first selected options for print settings of a printing device;
receiving first print capabilities data from the printer driver, wherein the first print capabilities data were generated based on the first print setting options data;
generating, based on the first print capabilities data, a base print capabilities lookup table that includes one or more first print capabilities of the print settings of the printing device;
sending second print setting options data to the printer driver, wherein the second print setting options data define second selected options for the print settings of the printing device;
receiving second print capabilities data from the printer driver, wherein the second print capabilities data were generated based on the second print setting options data, and wherein the second print capabilities data include at least one print capability different from the one or more first print capabilities; and
parsing the second print capabilities data to read print capabilities for each print setting in the second print capabilities data and, while parsing the second print capabilities data,
finding print capabilities of a just-read print setting in the base print capabilities lookup table, and
comparing the print capabilities of the just-read print setting in the second print capabilities data to the print capabilities of the just-read print setting in the base print capabilities lookup table, and
when a difference is found, generating delta print capabilities data indicating the difference between the print capabilities of the just-read print setting in the second print capabilities data and the print capabilities of the just-read print setting in the base print capabilities lookup table.

7. The one or more non-transitory computer-readable media of claim 6, wherein the first print capabilities data comprise markup language data, the second print capabilities data comprise markup language data, and the delta print capabilities data comprise markup language data.

8. The one or more non-transitory computer-readable media of claim 6, wherein the operations further comprise updating a user interface based on the delta print capabilities data.

9. The one or more non-transitory computer-readable media of claim 8, wherein parts of the user interface that are associated with the different print capabilities that are included in the delta print capabilities data are modified, and wherein parts of the user interface that are not associated with the different print capabilities that are included in the delta print capabilities data are not modified.

10. The one or more non-transitory computer-readable media of claim 6, wherein the operations further comprise:
adding the print capabilities of the just-read print setting to a resulting print capabilities lookup table while parsing the second print capabilities data; and
after parsing the second print capabilities data, designating the resulting print capabilities lookup table as the base print capabilities lookup table.

11. A device for comparing print capabilities, the device comprising:
a computer-readable storage medium; and
one or processors that are coupled to the computer-readable storage medium and that are configured to cause the device to
send first print setting options data to a printer driver, wherein the first print setting options data define first selected options for print settings of a printing device;
receive first print capabilities data from the printer driver, wherein the first print capabilities data were generated based on the first print setting options data;
generate, based on the first print capabilities data, a base print capabilities lookup table that includes one or more first print capabilities of the print settings of the printing device;
send second print setting options data to the printer driver, wherein the second print setting options data define second selected options for the print settings of the printing device;
receive second print capabilities data from the printer driver, wherein the second print capabilities data were generated based on the second print setting options data, and wherein the second print capabilities data includes at least one print capability different from the one or more first print capabilities; and
parse the second print capabilities data to read the print capabilities for each print setting in the second print capabilities data and, while parsing the second print capabilities data,
find print capabilities of a just-read print setting in the base print capabilities lookup table,
compare the print capabilities of the just-read print setting in the second print capabilities data to the print capabilities of the just-read print setting in the base print capabilities lookup table, and
when a difference is found, generate delta print capabilities data indicating the difference between the print capabilities of the just-read print setting in the second print capabilities data and the print capabilities of the just-read print setting in the base print capabilities lookup table.

12. The device of claim 11, wherein the first print capabilities data comprise markup language data, the second print capabilities data comprise markup language data, and the delta print capabilities data comprise markup language data.

13. The device of claim 11, wherein the one or more processors are further configured to cause the device to update a user interface based on the delta print capabilities data.

14. The device of claim 13, wherein the one or more processors are further configured to cause the device to modify parts of the user interface that are associated with the different print capabilities that are included in the delta print capabilities data and not modify parts of the user interface that are not associated with the different print capabilities that are included in the delta print capabilities data.

15. The device of claim 11, wherein the one or more processors are further configured to cause the device to
  add the print capabilities of the just-read print setting to a resulting print capabilities lookup table while parsing the second print capabilities data; and
  after parsing the second print capabilities data, designate the resulting print capabilities lookup table as the base print capabilities lookup table.

* * * * *